(12) United States Patent
Miller et al.

(10) Patent No.: US 11,427,768 B2
(45) Date of Patent: Aug. 30, 2022

(54) TREATMENT OF CONTAMINATED OIL PRODUCED BY OIL AND GAS WELLS

(71) Applicants: Lake Country Fracwater Specialists, LLC, Pace, FL (US); Addleman Enterprises, Inc., Somerset, PA (US)

(72) Inventors: Francis Miller, Pace, FL (US); Timothy Phillips, Bloomfield, NM (US); Steve Addleman, Somerset, PA (US)

(73) Assignees: Lake Country Fracwater Specialists, LLC, Pace, FL (US); Addleman Enterprises, Inc., Somerset, PA (US)

( * ) Notice: Subject to any disclaimer, the term of this patent is extended or adjusted under 35 U.S.C. 154(b) by 57 days.

(21) Appl. No.: 16/977,425

(22) PCT Filed: Mar. 1, 2019

(86) PCT No.: PCT/US2019/020193
§ 371 (c)(1),
(2) Date: Sep. 1, 2020

(87) PCT Pub. No.: WO2019/169214
PCT Pub. Date: Sep. 6, 2019

(65) Prior Publication Data
US 2021/0002560 A1    Jan. 7, 2021

Related U.S. Application Data

(60) Provisional application No. 62/637,815, filed on Mar. 2, 2018.

(51) Int. Cl.
*C10G 27/14*    (2006.01)
*C10G 31/08*    (2006.01)
(Continued)

(52) U.S. Cl.
CPC ......... *C10G 27/14* (2013.01); *B01D 17/0205* (2013.01); *B01D 17/047* (2013.01);
(Continued)

(58) Field of Classification Search
CPC ........ C10G 27/14; C10G 31/08; C10G 31/10; C10G 33/04
See application file for complete search history.

(56) References Cited

U.S. PATENT DOCUMENTS 5,273,664 A    12/1993   Schulz
2010/0213119 A1    8/2010   Generes et al.
(Continued)

OTHER PUBLICATIONS

International Search Report dated Jul. 19, 2019 in PCT Appl. No. US2019/020193. EFS file name 20210311_16-977425_NPL_Cite1.
(Continued)

*Primary Examiner* — Renee Robinson
(74) *Attorney, Agent, or Firm* — John M. Hammond; Patent Innovations LLC

(57) ABSTRACT

A method of treating a contaminated oil comprising preparing a brine solution, adding ozone to the brine solution to produce ozonated brine solution, adding a volume of ozonated brine solution to a volume of the contaminated oil, mixing the volumes of contaminated oil and ozonated brine solution with coagulant and surfactant at a shear rate sufficiently high so as to cause formation of an emulsion of the contaminated oil and the brine solution, stopping the mixing, thereby causing the emulsion to separate into an aqueous brine liquid phase and an oil liquid phase, separating the brine liquid phase from the oil liquid phase, and separating at least one contaminant from the oil liquid phase to produce a volume of purified oil.

20 Claims, 5 Drawing Sheets

(51) Int. Cl.
*B01D 17/02* (2006.01)
*B01D 17/04* (2006.01)
*B01D 17/12* (2006.01)
*B01J 4/00* (2006.01)
*C10G 31/10* (2006.01)
*C10G 33/04* (2006.01)
*E21B 43/16* (2006.01)
*B01F 23/231* (2022.01)

(52) U.S. Cl.
CPC ............ *B01D 17/12* (2013.01); *B01F 23/231* (2022.01); *B01J 4/001* (2013.01); *C10G 31/08* (2013.01); *C10G 31/10* (2013.01); *C10G 33/04* (2013.01); *E21B 43/16* (2013.01); *C10G 2300/1033* (2013.01); *C10G 2300/80* (2013.01)

(56) References Cited

U.S. PATENT DOCUMENTS

| | | |
|---|---|---|
| 2011/0186525 A1 | 8/2011 | Dixit |
| 2014/0042058 A1* | 2/2014 | Janssen .................... C09K 8/58 |
| | | 208/188 |
| 2016/0068417 A1 | 3/2016 | Buschmann |
| 2017/0058189 A1 | 3/2017 | Sehgal et al. |
| 2018/0030360 A1 | 2/2018 | Trevino et al. |
| 2021/0002541 A1 | 1/2021 | Phillips et al. |

OTHER PUBLICATIONS

Written Opinion dated Jul. 19, 2019 in PCT Appl. No. US2019/020193. EFS file name 20210311_16-977425_NPL_Cite2.

* cited by examiner

TREATMENT OF CONTAMINATED OIL PRODUCED BY OIL AND GAS WELLS

TECHNICAL FIELD

Oil well drilling and production of hydrocarbon oils from drilled wells.

BACKGROUND ART

During the operation of developing oil and gas wells utilizing hydraulic fracturing (also known as hydrofracturing) procedures, a liquid composition is used to facilitate the hydraulic fracturing process. In the process of developing the well, a well bore is typically drilled vertically, and subsequently may be drilled horizontally through various strata of subterranean rock formations. Explosive charges are sent into the well bore, which are then detonated, thereby fracturing the rock formations around the well bore. Small cracks, i.e. separations, are formed in the rock formations as a result of the fracturing. The hydraulic fracturing liquid, which contains "proppant" materials such as sand, is then pumped down the well bore at extremely high pressure into the fractured rock formations. These proppant materials are forced into the fractured rock formation where they "prop" open the fractures in the rock formation.

The pressure on the hydrofracturing fluid is then released which results in a significant portion of the fluid returning to the surface through the well bore. This fluid is referred to as flowback water. However a significant portion of the fluid also remains in the formation. The percentage of fluid which returns to the surface compared to the percentage which remains in the formation is highly variable and is a function of the formation, the depth of the bore, the specific hydrofracturing procedures utilized and numerous other criteria.

Once the flowback water has discharged from the well bore, oil and/or gas will then flow through the cracks to the well bore, and on up to the ground surface, where it can be captured for uses such as refinement into liquid and/or gas fossil fuels, chemical feedstocks, and the like. The amount of oil and/or gas that is produced by the well is far greater than otherwise would occur if the rock formations were not subjected to the hydraulic fracturing process.

The hydraulic fracturing liquid composition contains chemical additives that increase its viscosity in order to maintain the presence of other constituents, such as granules of sand, in the liquid and convey them into the formation. The chemicals utilized to increase the viscosity may be referred to as "gels", "gel" or "crosslink". These gels are typically naturally occurring or synthetic polymeric materials. A common gel-forming material is guar gum. Although there are many other materials which are utilized to increase viscosity, the guar gum is one of the more common ones.

When the hydraulic fracturing process is complete, and oil and/or gas production from the well ensues, a portion of the oil will often contain some of the gel as a contaminant. The presence of the gel in the oil is problematic in that it changes the physical properties of the oil; it helps to entrain particulate matter in the oil and also entrains water in the oil. The presence of the particulate matter and the water in the oil is problematic for many reasons. Numerous process have been attempted to separate and remove the gel from the oil and release the particulate matter and water from the oil. However, in many Central American oil deposits, for example, the viscosity and specific gravity of the produced oil coupled with the nature of the gel have resulted in a condition that conventional means of separation have not been able to consistently accommodate in a time or cost effective manner.

The contaminated oil cannot be sold as crude oil for refineries, etc. and is understood to be marketed as an inexpensive fuel for low grade uses such as cement production, etc. Attempts have been made to purify the contaminated oil using conventional separation technologies. For example, heating the oil has been performed, followed by centrifugation and/or adding surfactants to the oil, followed by further centrifugation as well as other combinations of the above. These efforts have not consistently achieved satisfactory results.

What is needed to address the above problem is a simple, fast and economical means to separate the gel from the oil and release the water and the particulate matter, thereby resulting in purified oil that is suitable for higher value uses, such as crude oil for refineries.

SUMMARY

To solve the problem of the presence of hydraulic fracturing gels in produced oil, the Applicants have discovered a process which is capable of achieving the separation of the gels from the oil. The Applicants' process utilizes ozone, a solution of brine at an elevated concentration, coupled with addition of an amphoteric surfactant and a coagulant chemical. These components are mixed with the contaminated oil at high shear rates. The aqueous brine phase is allowed to separate from the oil phase and any solid particulates that are present are allowed to settle out of the brine phase. The oil phase liquid is then centrifuged. In the centrifuge, any remaining emulsified water droplets and remaining solid particulates are separated and removed from the oil. The centrifuged oil is then suitable as saleable crude oil, for a much higher price than the untreated contaminated oil can be sold for. The brine liquid phase is collected and saved for reuse. This brine is also purified by the chemical reagents used in the Applicants' process, and is recovered as colorless, clear brine.

Without willing to be bound by any particular theory, the Applicants believe that the presence of the ozone and the coagulant chemical decompose the gel chemically during the intense high-shear mixing of the mixed fluids; following the breakdown of the gel, the surfactant permits the finely dispersed brine droplets to agglomerate within the oil layer and separate out of the oil and form the brine phase. This formation of an oil phase and a brine phase has been observed experimentally and in commercial scale prototype work.

More specifically, in accordance with the present disclosure, there is provided a method of treating a contaminated oil. The method comprises preparing a brine solution; adding ozone to the brine solution to produce ozonated brine solution; adding a volume of ozonated brine solution to a volume of the contaminated oil; adding a coagulant to the volume of contaminated oil; adding a surfactant to the volume of contaminated oil; mixing the volumes of contaminated oil and ozonated brine solution, the coagulant, and the surfactant at a shear rate sufficiently high so as to cause formation of an emulsion of the contaminated oil and the brine solution; stopping the mixing, thereby causing the emulsion to separate into an aqueous brine liquid and an oil liquid phase; separating the brine liquid phase from the oil liquid phase; and separating at least one contaminant from the oil liquid to produce a volume of purified oil. In certain embodiments, the oil may be an organic oil, such as a hydrocarbon oil obtained from an oil well.

In certain embodiments, adding ozone to the brine solution may be performed by discharging bubbles of ozone having a diameter of about 200 nanometers into the brine solution. The volume of ozonated brine solution may be about two times the volume of the contaminated oil. The coagulant may be a metal chloride, and the surfactant may be an amphoteric surfactant, which may be prepared by combining chloroacetic acid with an amide derived from dimethylaminopropylamine and lauric acid, or a naturally occurring amide of similar structure.

The contaminated oil may contain a gel additive contaminant. In such circumstances, the gel additive contaminant may be caused to decompose during the mixing the volumes of contaminated oil and ozonated brine solution, and the coagulant, and the surfactant, to form a gel decomposition product. The brine liquid separated from the oil liquid may contain the gel decomposition product. Alternatively or additionally, the at least one contaminant from the oil liquid may be a portion of the gel decomposition product.

In certain embodiments, the adding the volume of ozonated brine solution to the volume of the contaminated oil may be performed by continuously mixing the ozonated brine solution and the contaminated oil in flow through a conduit. At least one of a high shear pump and an in-line agitator may be used for the continuous mixing. The method may further comprise adding a base to adjust the pH of the contaminated oil. The method may further comprise adding hydrogen peroxide during mixing the volumes of the contaminated oil and the ozonated brine solution, the coagulant, and the surfactant. The method may further comprise injecting ozone into the conduit during the mixing the ozonated brine solution and the contaminated oil in the conduit. The method may further comprise adding a reagent that is effective in providing advanced oxidation of organic contaminants in the contaminated oil.

The mixing the volumes of the contaminated oil and the ozonated brine solution, the coagulant, and the surfactant may be performed by causing flow of the aqueous brine liquid and the oil liquid through a series of high shear cascading mixing tanks. Separating the brine liquid from the oil liquid may be performed by causing plug flow through a separation tank.

In accordance with the present disclosure, there is further provided an apparatus for treating a contaminated oil. The apparatus comprises a source of brine solution; an ozone source in communication with the source of brine solution and configured to deliver ozone into the brine solution to ozonate the brine solution; a source of coagulant; a source of surfactant; at least one mixing tank in communication with the source of brine solution, the source of coagulant, and the source of surfactant, and configured to receive a volume of contaminated oil, a volume of ozonated brine solution from the source of brine solution, coagulant from the source of coagulant, and surfactant from the source of surfactant, and mix the contaminated oil, ozonated brine solution, coagulant, and surfactant at a shear rate sufficiently high so as to cause formation of an emulsion of the contaminated oil and the brine solution; a separation tank in communication with the at least one mixing tank and configured to receive emulsion from the mixing tank; and a centrifuge in communication with the separation tank and configured to receive oil liquid from the separation tank.

In certain embodiments, the ozone source is comprised of an injector configured to inject nanobubbles of ozone into the brine solution. The apparatus may be further comprised of a conduit in communication with the source of brine solution and configured to receive the volume of contaminated oil and the volume of ozonated brine, and deliver a mixture of contaminated oil and ozonated brine to the mixing tank. The ozone source may be further comprised of an injector configured to inject nanobubbles of ozone into the conduit.

The apparatus may be further comprised of a source of base in communication with the mixing tank. The apparatus may be further comprised of a source of hydrogen peroxide in communication with the mixing tank. The apparatus may be further comprised of at least one cascading mixing tank in communication with the source of brine solution, the source of coagulant, and the source of surfactant, and configured to receive the volume of contaminated oil, the volume of ozonated brine solution from the source of brine solution, the coagulant from the source of coagulant, and the surfactant from the source of surfactant. The separation tank may be comprised of a vertical overflow weir and a vertical underflow weir. The apparatus may be further comprised of at least one of a high shear pump and an in-line agitator configured to deliver contaminated oil and brine solution to the mixing tank.

BRIEF DESCRIPTION OF THE DRAWINGS

The present disclosure will be provided with reference to the following drawings, in which like numerals refer to like elements, and in which.

Figure 1:
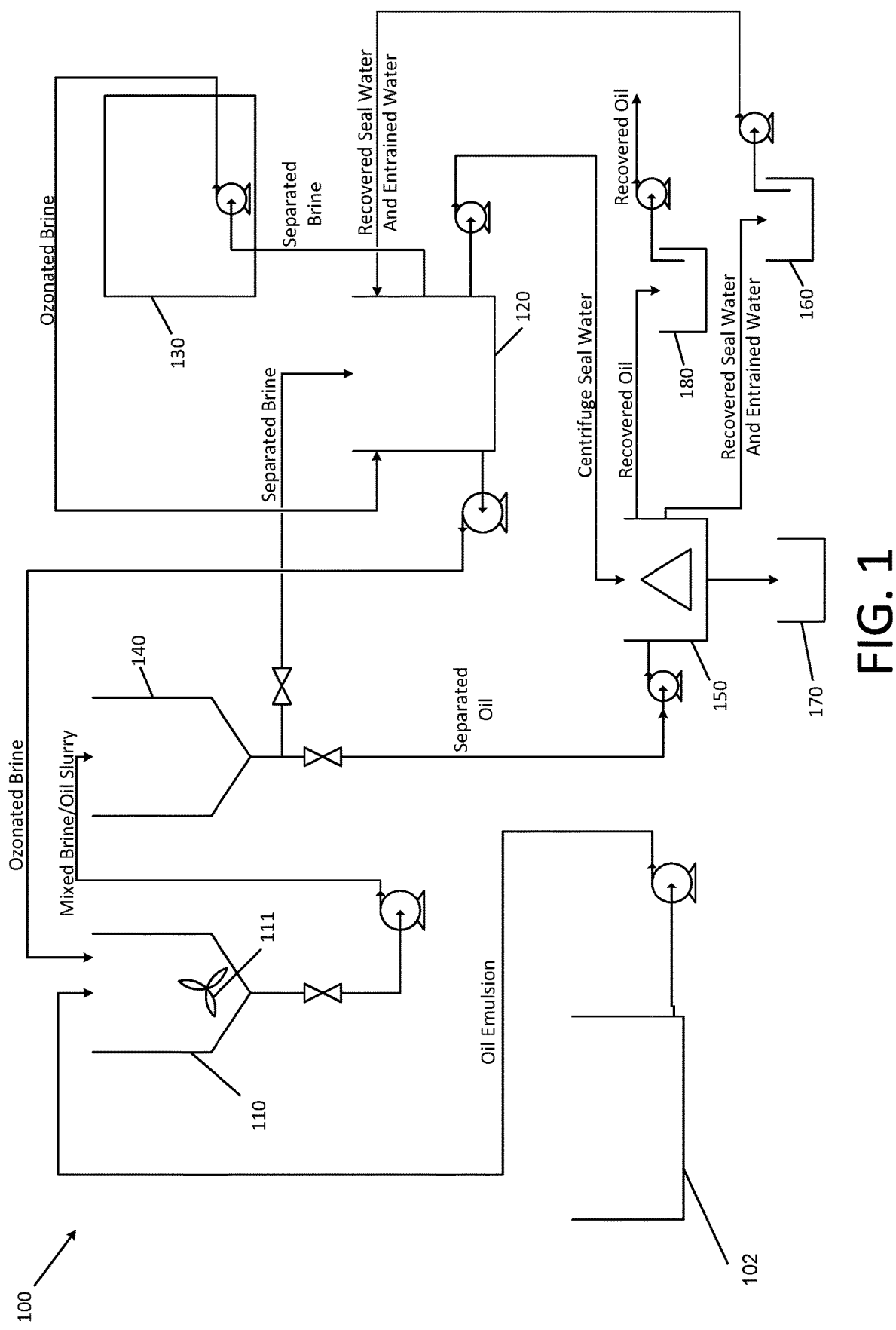
FIG. 1 is a schematic diagram of one embodiment of the Applicants' apparatus and method for treatment of contaminated oil produced by hydraulically fractured well.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

BEST MODE FOR CARRYING OUT THE INVENTION

For a general understanding of the present invention, reference is made to the drawings. In the drawings, like reference numerals have been used throughout to designate identical elements.

A prototype oil treatment apparatus and an oil treatment method demonstration process have been developed by the Applicants. The apparatus is shown schematically in FIG. 1, and a further embodiment is shown in the detailed schematic diagram of FIGS. 2A and 2B. It is to be understood that in the following disclosure, the description of the Applicants' apparatus and method are to be considered exemplary, and that the specific equipment, scale, chemical reagents, proportions thereof, flow rates, mixing speeds, and other process parameters may vary from that described while still remaining functional and within the scope of the present invention.

The Applicants' oil treatment apparatus and methods will now be described in detail with reference to apparatus 100 of FIG. 1, apparatus 101 of FIGS. 2A and 2B, and methods 200 of FIG. 3.

Contaminated oil from a wellbore is collected in a vessel. The contaminated oil may be tested for entrained water using a suitable apparatus, such as a laboratory scale centrifuge (not shown). The contaminated oil may be collected directly into one or more holding tanks 102, or the contaminated oil may be collected in tanker trucks 103 (FIG. 2A) and delivered to the holding tank 102. In one embodiment, the holding tank 102 may contain about 500 barrels, i.e., about 20,000 gallons.

From the holding tank 102, the contaminated oil is transferred in step 210 to a high shear mixing tank 110 equipped with a high speed mixer 111. In one exemplary embodiment, the contaminated oil may be transferred in 250 gallon batches to the high shear mixing tank 110.

In step 204, sodium chloride salt solution is made up in a brine mixing and holding tank 120 at a specific gravity sufficient to enhance the separation of the water from the oil once it is de-emulsified. In one embodiment, this was determined experimentally to be 20% sodium chloride in water by weight. Alternatively, calcium chloride and/or potassium chloride are contemplated as alternative salts that may be used for or included in the brine solution.

In the operation of the Applicants' apparatus and method, the salt solution may be recycled multiple times. However, fresh salt solution is preferred for the initial startup of the apparatus and method.

In one embodiment, bags 122 of salt are added to the mixing tank 120 which is used to prepare a saturated or nearly saturated salt solution. Fresh water may be added to adjust the salt concentration to the desired level.

In step 206, the brine in tank 120 is ozonated to a desired dissolved ozone concentration. In one embodiment, this was determined experimentally to be approximately one to two PPM ozone as a minimum concentration. However increasing the ozone concentration further, up to 15 PPM is preferred.

In one embodiment the salt solution is ozonated with nanobubbles, the bubbles having a diameter of approximately 200 nanometers. In other embodiments, the nanobubbles may have diameters of between 50 and 200 nanometers. The bubbles are not necessarily of a uniform size distribution, and instead may have a size distribution within the above range. In one embodiment, the salt solution may be ozonated by circulating it through an ozone injection or infusion system 130, which injects or infuses nanobubbles of ozone into the flowing stream.

From the brine tank 120, the salt solution/brine is transferred in step 220 to the high speed agitation tank 110 in batches of a predetermined volume required for the process, the volume depending upon the volume of contaminated oil being treated. In one embodiment, this was determined experimentally to be approximately two parts of ozonated brine per part of contaminated oil by volume.

A coagulant (source not shown in FIG. 1) is added in step 230 to the high speed agitation tank 110. The coagulant is preferably an aluminum chlorhydrate, and is added to the agitation tank 110 at concentration of approximately 500 to 1000 parts per million by volume based on the total volume of liquid.

A surfactant (source not shown in FIG. 1) is added in step 240 to the high speed agitation tank 110. The surfactant is preferably an amphoteric surfactant. In one embodiment, the surfactant may be made by combining chloroacetic acid with the amide derived from dimethylaminopropylamine and lauric acid. In certain embodiments, the surfactant may {[3-(Dodecanoylamino)propyl](dimethyl)ammonio} acetate. Such surfactant is added to the agitation tank at concentration of approximately 500 to 1000 parts per million based on the total volume of liquid.

In step 250, the oil/brine/chemical additive blend is subjected to high speed mixing for a predetermined period of retention time in the agitation tank 110. In one embodiment, this was determined experimentally to be 20 minutes with agitation at 1800 rpm, resulting in an agitator tip speed of 94 feet per second. The tip speed of the agitator 111 in agitation tank 110 is chosen to cause high shear, thereby resulting in intimate contact between the oil and the heavier brine solution in order to achieve the desired results. In other words, a large amount of interfacial surface area is created by causing the temporary formation of an emulsion of the oil phase and the aqueous brine phase by the high speed agitator 111. Alternative mixing configurations and shear imparting means are contemplated in the design of a commercial apparatus and method, which result in an equivalent degree of mixing and high shear as described above.

Upon completion of the mixing period, the oil/brine emulsion blend is transferred to a conical bottom settling tank 140. In one embodiment, a two hour settling time was utilized for the emulsion to separate into a continuous aqueous brine phase and an oil phase. Shorter times may be suitable. However, a laboratory analysis performed on a small (1500 milliliter) volume of oil/brine emulsion suggests that the settling process of step 260 should be at least 1 hour.

Following the predetermined settling period, the brine liquid phase layer is discharged from the bottom of the settling tank 140 in step 262. This brine may be returned to the brine tank 120 in step 266 for reuse; it is used for preparing additional brine for treatment of subsequent contaminated oil batches.

In step 264, the oil liquid phase layer which remains in the settling tank 140 is then fed, preferably by gravity, into a centrifuge 150. The centrifuge 150 is comprised of a high speed spinning basket, which subjects the treated oil to high centrifugal force, resulting in the separation of remaining constituents from the oil in step 270. Remaining droplets of brine phase are discharged to a brine sump tank 160 in step 272, and subsequently returned to the brine holding tank 120. Solid particulates in the oil, such as granules of sand and rock dust from well drilling are discharged to a solids collection sump 170 in step 274.

In step 280, the purified oil from the centrifuge 150 is discharged into a small sump tank 180, which may be proximate to the centrifuge 150. This oil may then be transferred to a storage tank (not shown). The purified oil is suitable for use as a high value oil in crude oil refining and other high value applications.

In the operation of the centrifuge 150, brine from the brine tank 120 may be used utilized as seal water on one or more seals in the centrifuge 150. This seal water may be combined with the extracted water from the oil within the centrifuge discharged into the brine sump tank 160. The combined brine may be transferred back to the brine feed tank 120 for reuse.

During startup of the centrifuge, a small volume of fluids produced may be returned to the contaminated oil storage tank 102, until steady state operation of the centrifuge with the desired separations is achieved.

Figure 2A:
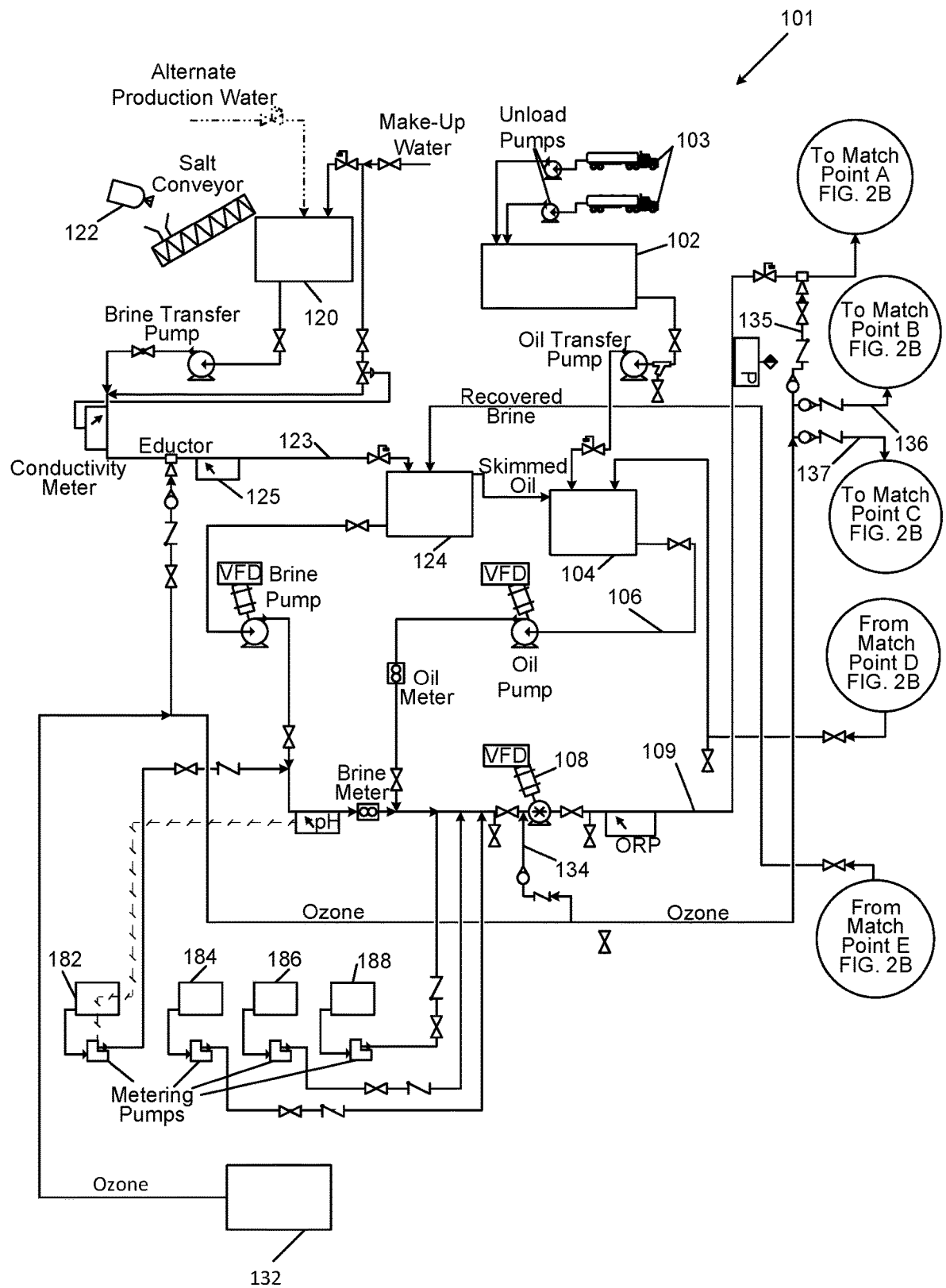
FIGS. 2A and 2B in combination are a detailed schematic diagram of the Applicants' apparatus and method, which shows certain exemplary equipment for performing the Applicants' method at a commercially viable scale.
Figure 2B:
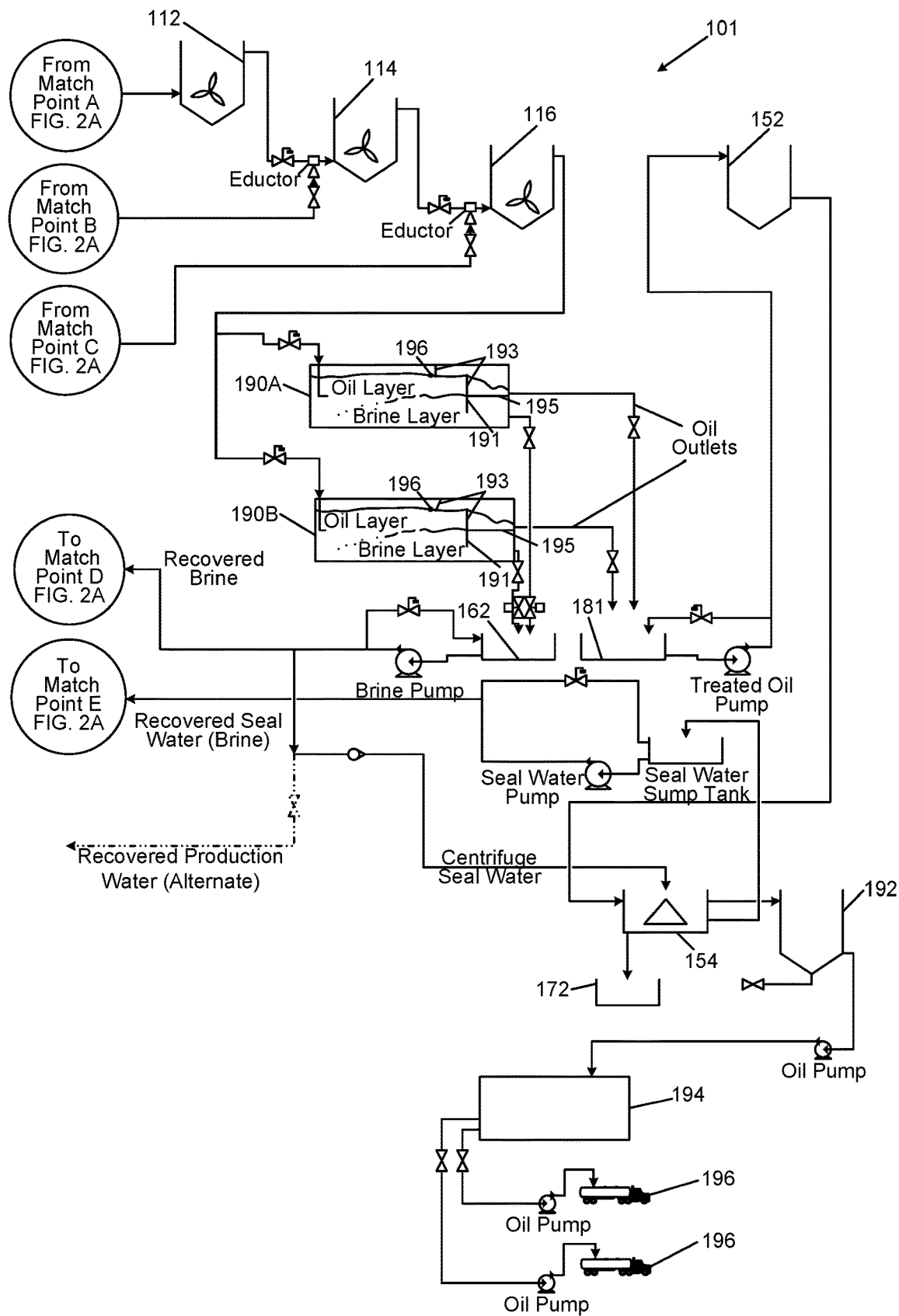
Figure 3:
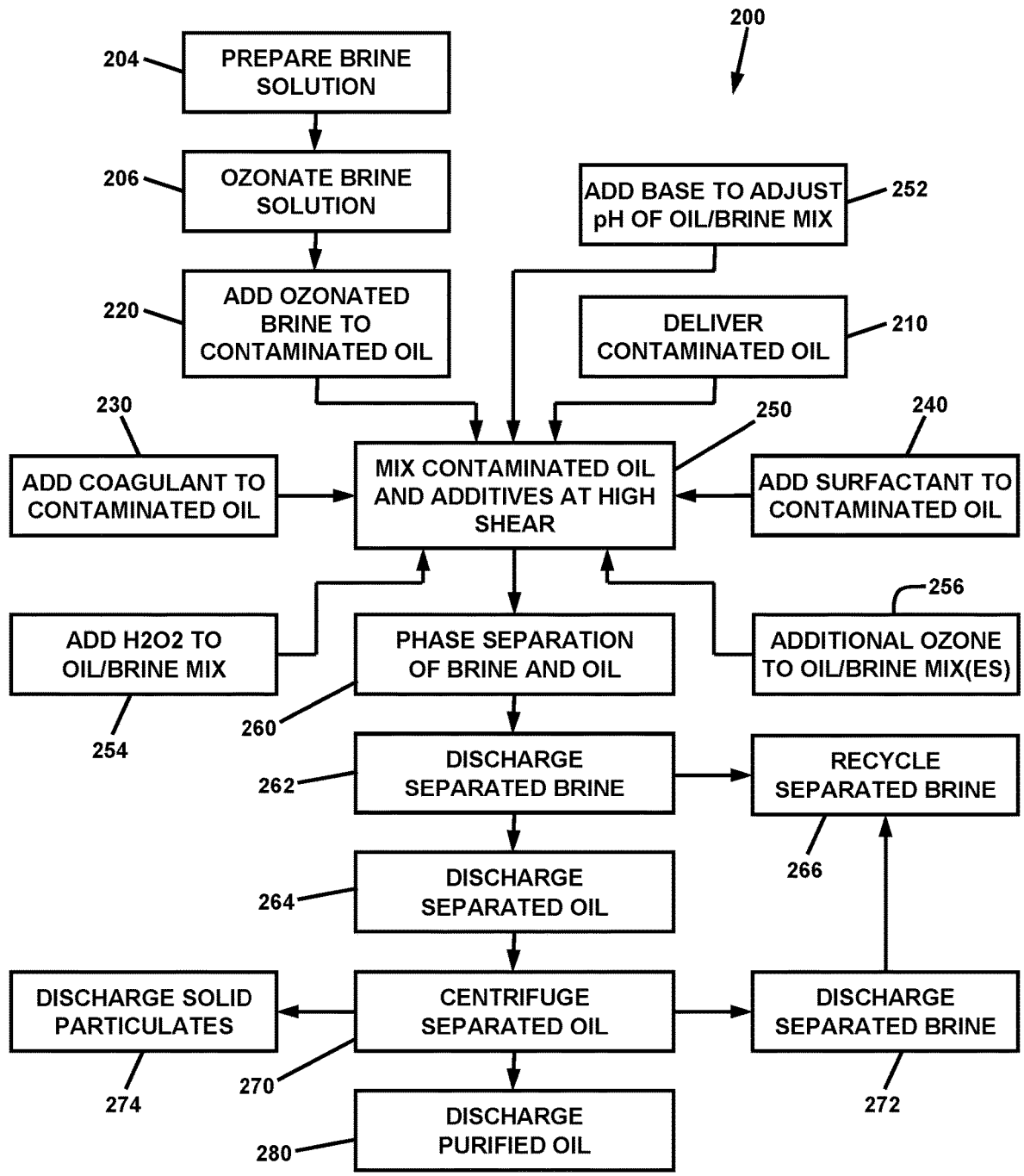
FIG. 3 is a flowchart depicting certain methods of treating contaminated oil in accordance with the invention.

Referring now to FIGS. 2A and 2B, a further embodiment of the Applicants' apparatus and method are described. The apparatus and method are configured with a larger scale commercial use being contemplated in particular. In certain embodiments, the apparatus 101 is configured to be operated in a continuous manner, i.e., the method 200 of treating contaminated oil in the apparatus 101 is performed as a continuous process.

As described previously, contaminated oil is delivered to the site of the apparatus 101. The contaminated oil may be tested prior to unloading to determine its specific gravity, entrained water, and viscosity and pH.

The contaminated oil is unloaded into one of multiple storage tanks 102 of adequate capacity based upon the results of the testing. Oils with similar characteristics may be blended together. In that manner, the treatment of the large volume of oil in each tank may be adjusted to optimize the process.

From the storage tank 102, in operation as a continuous process, the oil is transferred continuously in step 210 to a contaminated oil feed tank 104.

As described previously, sodium chloride salt solution is prepared in step 204 at a specific gravity sufficient to enhance the separation of the water phase from the oil. In one embodiment, 20% sodium chloride in water by weight has been determined to be suitable. Other salts and concentrations are contemplated.

As noted previously, in the operation of the Applicants' apparatus and method, the salt solution may be recycled multiple times. However, fresh salt solution is preferred for the initial startup of the apparatus and method.

In one embodiment, bags 122 of dry salt may be delivered to the site of the apparatus 101, for example, in conventional shipping bags of 50 kgs. or bulk bags of 1000 kgs. The salt is added to a commercial brine maker which produces saturated salt solution in brine tank 120. Fresh water may be added through a control system to adjust the salt concentration to the desired level.

The adjusted brine solution is delivered to a brine feed tank 124 when the volume in the feed tank 124 drops below a predetermined level. An ozone generation system 132 is provided, which may be connected to a conduit 123 that conveys brine from brine storage tank 120 to brine feed tank 124. In step 206, the ozone may be injected or infused as nanobubbles into the conduit 123. Alternatively, the salt solution may be ozonated by circulating it through an ozone injection or infusion system 132, which injects or infuses nanobubbles of ozone into a flowing stream (not shown). An oxidation/reduction potential (ORP) meter 125 may be used to determine the concentration of ozone in the ozonated brine delivered to tank 124.

In continuous operation of apparatus 101, the ozonated brine and the oil are fed continuously in steps 220 and 210 from their respective feed tanks 124 and 104 and proportioned and blended together in a conduit 106.

The ozonated brine and/or the oil/brine blend in the conduit 106 may be treated with four chemical reagents by continuous controlled injection with proportioning pumps. It is to be understood that the sequence of the addition of the chemicals is provided herein as one exemplary embodiment, but such sequence, proportions, and timing may be altered from that described immediately below.

In step 252, a first chemical reagent is sodium hydroxide or another suitable base delivered from tank 182 for the purposes of adjusting pH. The pH of oil produced from various hydrofracturing operations is often below desired levels and must be elevated.

A second chemical reagent delivered from tank 184 is the coagulant reagent as described previously for step 230.

A third chemical reagent delivered from tank 186 is the amphoteric surfactant reagent as described previously for step 240.

In step 254, a fourth chemical reagent is delivered from tank 188. The fourth chemical reagent is a reagent for performing advanced oxidation (AO). Suitable reagents may include, but are not limited to, reagents that form hydroxyl radicals, reagents that produce oxidant species when subjected to ultraviolet light, ozone based reagents, catalysts such as titanium dioxide, Fenton's reagent, ultrasonic irradiation generated reagents, sulfate radical based reagents, iron II persulfate reagents, alkyl persulfate reagents, and thermally activated persulfate reagents. In one embodiment, the advanced oxidation may be performed using a solution of hydrogen peroxide, which may be provided at a concentration of between 3% and 50%. However, any available concentration of hydrogen peroxide may be utilized. The hydrogen peroxide is added to the solution in order to achieve advanced oxidation conditions which are known to enhance the degradation of organic contaminants. Initial concentrations in the range of 15 parts per million up to 300 parts per million based upon the flowing volume of the oil/brine blend are expected to achieve the desired reactions in the majority of circumstances. However the ultimate concentration of hydrogen peroxide has been determined to be subject to the contaminant level in other solution and the pH as well as other factors, and may vary widely.

Immediately prior to an in line agitator, shear pump, or alternate shearing device 108, in step 256, additional ozone may be injected into the oil/brine blend through conduit 134. The introduction of the oil/brine blend into the high shear device results in intimate contact between the oil and the heavier brine solution in order to achieve the desired results.

The agitated oil/brine blend is transferred to the first of a series of three cascading mixing tanks 112, 114, and 116 through conduit 109.

The oil/brine blend is fed into the lower portion of the first tank 112 and flows out the upper portion of the tank 112. This ensures adequate mixing and retention time.

The flows of oil/brine blend through the second and third tanks 114 and 116 are configured substantially identical to that of the first tank 112.

Just prior to the oil/brine blend entering each of the mixing tanks, additional ozone may be injected into the oil/brine blends through conduits 135, 136, and 137.

The tip speed of the agitators in these tanks is chosen to cause high shear, thereby resulting in intimate contact between the oil and the heavier brine solution in order to achieve the desired results. In certain embodiments, a mixing impeller blade tip speed of 5 to 150 feet/second has been found to be effective in providing the required amount of shear. For any specific application, the desired impeller tip speed has been determined to be dependent upon the mixing vessel volume, the viscosity of the oil, the nature of the "gel" used in the hydrofracturing process and the concentration of solid and water contaminants in the oil. The above-cited blade tip speed of 5 to 150 feet/second is provided without limitation; lower or higher tip speeds may be effective, depending upon the above parameters.

Upon exiting the third mixing tank 116, the oil/brine blend may be split and delivered into two separation tanks 190A and 190B. The oil/brine blend passes through these tanks 190A and 190B in substantially plug flow.

As the oil/brine blend passes through the tanks 190A and 190B, the oil and brine separate in step 260. The total volume of the tanks 190A and 190B is selected in order to allow for sufficient retention time to achieve adequate separation of the water from the oil.

Baffles 191 and 193 as shown within the separation tanks 190A and 190B may be provided to enhance the separation of the two layers upon exiting the tanks. The baffles 191 and 193 are arranged, respectively, to create a vertical overflow full width weir over which the oil will flow, which also retains the oil within the tank to achieve the retention time; and a vertical underflow width weir, under which the brine must flow, which similarly retains the brine within the tanks 190A and 190B. A horizontal baffle 195 is provided to keep the layers separate as they exit the tanks 190A and 190B. In addition, a skimming device 196 is provided to capture and remove foam from the surface of the oil within the tank 190A and 190B. This foam has been observed in lab and commercial scale pilot work.

The brine phase, which is discharged from tanks 190A and 190B in step 262, is collected in a sump tank 162 and may be pumped back to the brine feed tank 120. The recovered brine may be periodically tested for clarity and for dissolved organic materials to ensure the process is operating as desired.

The oil layer is collected in a sump 181 and transferred to a centrifuge feed tank 152 in step 264.

From the centrifuge feed tank 152 the oil is fed into an oil separator, such as centrifuge 154, and centrifugation proceeds in step 270. Brine from the brine feed tank may be utilized as seal water on this centrifuge.

The clean oil from the centrifuge 154 is transferred in step 280 to one of multiple quality control interim storage tanks 192. The oil in these tanks is sampled and tested to ensure it meets the desired parameters. Once the oil has been approved for release by quality control it may be transferred to one of multiple recovered oil storage tanks 194. The oil from the recovered oil storage tanks 194 is then loaded out into tankers 196 for transport.

Brine seal water which discharges from the centrifuge 154 may be transferred back to the brine feed tank 120 for reuse. Solids which discharge from the bottom outlet of the centrifuge 154 are collected in a container 172 at the base of the centrifuge 154 in step 274, and disposed of according to applicable environmental regulations.

Alternatively, in lieu of using fresh water for make-up of the brine, waste production water from the oil production operations may be utilized as the source water for the saturated brine tank 120. The chemical activity of this process may be as disclosed in the water treatment process as provided under U.S. patent application Ser. No. 13/461,871 of Miller and Addleman, the disclosure of which is incorporated herein by reference. The production water is expected to be cleaned through this process to produce clean brine for potential reuse similar to the process under the above U.S. patent application Ser. No. 13/461,871. In lieu of recycling this water within the oil treatment system the cleaned brine may be sent to storage for use in hydraulic fracturing or other suitable oil field operations or for further treatment.

Figure 4:
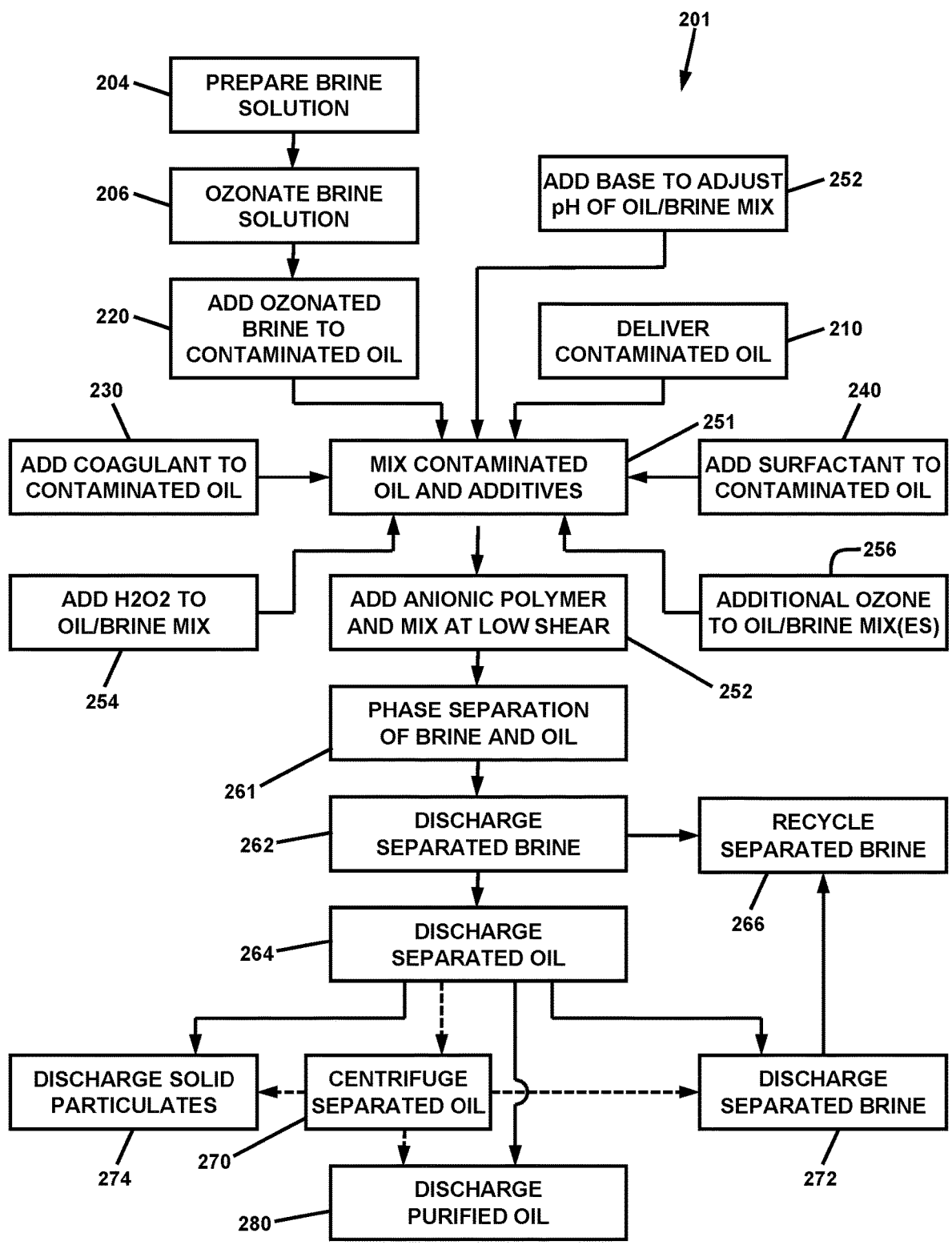
FIG. 4 is a flowchart depicting alternative methods of treating contaminated oil in accordance with the invention.

FIG. 4 is a flowchart depicting alternative methods of treating contaminated oil in accordance with the invention. The method 201 is similar to the method 200 of FIG. 3 as described previously herein, and may include the same steps 204-240. However, the Applicants have discovered that after the step 251 of mixing the contaminated oil and additives, which may be performed at high shear rates as described previously, it is beneficial in an additional step 252 to add an anionic polymer to the volume of oil and additives contained in the mixing tank 110. Suitable anionic polymers include, but are not limited to, 303AH as available from Water Specialists and Technologies, LLC of Sanford, Fla. The anionic polymer is typically added as an aqueous solution that is added to the mixing tank 110. The addition of the anionic polymer is performed under mild mixing, e.g., under shear conditions provided by a mixing impeller with a blade tip speed of 1 to 5 feet/second. The optimal tip speed has been determined to be dependent upon the mixing vessel volume, the viscosity of the oil, the nature of the "gel" used in the hydrofracturing process and the concentration of solid and water contaminants in the oil. The above-cited blade tip speed of 1 to 5 feet/second is provided without limitation; lower or higher tip speeds may be effective, depending upon the above parameters. The Applicants have discovered that when performing such process steps and conditions, in the phase separation 261 of brine and oil, the solid particulate remaining in the oil portion of the mixture is unexpectedly flocculated out of the oil portion and accumulated just below the surface of the oil at the top of the brine layer. Additionally, this procedure produced oil layers in the respective separation tanks 190A and 190B that are at or near acceptable levels of suspended solids without the requirement of a post treatment centrifuge for some oil slurries. Accordingly, step 270, centrifuging the separated oil, is shown in dotted line format, indicating that such step is optional, and under these process conditions, is not necessary. Instead, after discharging the separated brine 272, discharging the purified oil 280 may be performed without a centrifuging step. It was also observed in experimental trials that in some instances, intense shear mixing of the contaminated oil and additives in step 251 may not be required prior to the addition of the anionic polymer. When mixing at lower shear rate, such as with an impeller tip speed of 1-5 feet/second, the particulate matter that settles out of the oil layer in step 261 is observed to be of a visibly larger size. (It is to be understood that the above-cited blade tip speed of 1 to 5 feet/second is exemplary, and that lower or higher tip speeds may be effective.) Advantageously, it appears that the larger particles remain intact in the absence of the intense shear mixing and transfer more freely out of the oil layer into the brine layer without centrifuging, and then settle more quickly out of the brine layer than the finer particulate matter that is produced from the intense shear mixing on these larger particles. This discovery may provide a significant benefit in the method 201 by mitigating the need for a centrifuge, which is an expensive and complex piece of equipment. It is noted that the untreated oil could not be separated by centrifugation equipment.

It is, therefore, apparent that there has been provided, in accordance with the present invention, a method and apparatus for treatment of contaminated oil at an oil well or a central receiving or treatment location. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in subsequent claims.

We claim:

1. A method of treating a contaminated oil, the method comprising:
    a) preparing a brine solution;
    b) adding ozone to the brine solution to produce ozonated brine solution;
    c) adding a volume of ozonated brine solution to a volume of the contaminated oil;
    d) adding a coagulant to the volume of contaminated oil;
    e) adding a surfactant to the volume of contaminated oil;
    f) mixing the volumes of contaminated oil and ozonated brine solution, the coagulant, and the surfactant at a shear rate sufficiently high so as to cause formation of an emulsion of the contaminated oil and the ozonated brine solution;
    g) stopping the mixing, thereby causing the emulsion to separate into an aqueous brine liquid phase and an oil liquid phase;
    h) separating the aqueous brine liquid phase from the oil liquid phase; and
    i) separating at least one contaminant from the oil liquid phase to produce a volume of purified oil.

2. The method of claim 1, wherein the ozone concentration in the ozonated brine solution is up to 15 parts per million of ozone.

3. The method of claim 1, wherein the adding ozone to the brine solution is performed by discharging bubbles of ozone having a diameter of about 200 nanometers into the brine solution.

4. The method of claim 1, wherein the volume of ozonated brine solution is approximately two times the volume of the contaminated oil.

5. The method of claim 1, wherein the at least one contaminant in the oil liquid phase is a solid particulate contaminant.

6. The method of claim 1, wherein the at least one contaminant in the oil liquid phase is brine.

7. The method of claim 1, wherein the contaminated oil contains gel additive contaminant.

8. The method of claim 7, wherein the gel additive contaminant is decomposed during the mixing the volumes of contaminated oil and ozonated brine solution, and the coagulant, and the surfactant, to form a gel decomposition product.

9. The method of claim 8, wherein the brine liquid phase separated from the oil liquid phase contains the gel decomposition product.

10. The method of claim 8, wherein at least one contaminant from the oil liquid phase is the gel decomposition product.

11. The method of claim 1, wherein the adding the volume of ozonated brine solution to the volume of the contaminated oil is performed by continuously mixing the ozonated brine solution and the contaminated oil in flow through a conduit.

12. The method of claim 11, further comprising adding a base to adjust the pH of the contaminated oil.

13. The method of claim 11, further comprising adding hydrogen peroxide during mixing the volumes of the contaminated oil and the ozonated brine solution, the coagulant, and the surfactant.

14. The method of claim 11, further comprising injecting ozone into the conduit during the mixing the ozonated brine solution and the contaminated oil in the conduit.

15. The method of claim 11, wherein the separating the aqueous brine liquid phase from the oil liquid phase is performed by causing plug flow through a separation tank.

16. The method of claim 11, wherein the mixing the volumes of contaminated oil and ozonated brine solution is further comprised of causing the volumes of contaminated oil and ozonated brine solution to flow through at least one of a high shear pump and an in-line agitator.

17. The method of claim 1, wherein the mixing the volumes of the contaminated oil and the ozonated brine solution, the coagulant, and the surfactant is performed by flow of combined volumes of the contaminated oil, the ozonated brine solution, the coagulant, and the surfactant through a series of high shear cascading mixing tanks.

18. The method of claim 1, further comprising storing the separated aqueous brine liquid phase in a vessel in communication with at least one of a hydraulic fracturing apparatus, an oil well drilling apparatus, a gas well drilling apparatus, and an oil field apparatus.

19. The method of claim 1, wherein the contaminated oil is a hydrocarbon oil.

20. The method of claim 1, further comprising withdrawing the volume of contaminated oil from an oil well.

* * * * *